United States Patent [19]

Reynolds et al.

[11] Patent Number: 4,852,347
[45] Date of Patent: Aug. 1, 1989

[54] ADVANCED COMPOSITE POLAR BOSS

[75] Inventors: Hugh M. Reynolds, San Jose, Calif.; Curt M. Kawabata, North Ogden, Utah

[73] Assignee: The United States of America as represented by the Secretary of the Air Force, Washington, D.C.

[21] Appl. No.: 109,810

[22] Filed: Oct. 16, 1987

[51] Int. Cl.⁴ .............................. F02K 9/32; F02K 9/97
[52] U.S. Cl. ...................................... 60/253; 60/271; 60/909; 239/265.11
[58] Field of Search ................... 60/253, 271, 909; 239/265.11, DIG. 19; 220/414; 156/172; 102/347, 374

[56] References Cited

U.S. PATENT DOCUMENTS

| | | | |
|---|---|---|---|
| 2,995,011 | 8/1961 | Kimmel | 60/909 |
| 3,066,484 | 12/1962 | Buchanon et al. | 60/253 |
| 3,212,257 | 10/1965 | Frey et al. | 60/271 |
| 3,465,965 | 9/1969 | Schrewelius | 239/265.15 |
| 3,866,792 | 2/1975 | Minke | 60/909 |
| 4,359,190 | 11/1982 | Pagano | 239/265.11 |
| 4,360,116 | 11/1982 | Humphrey | 220/414 |
| 4,369,894 | 1/1983 | Grover et al. | 220/414 |
| 4,438,858 | 3/1984 | Grover | 220/414 |
| 4,477,024 | 10/1984 | O'Driscoll et al. | 239/265.11 |
| 4,501,841 | 2/1985 | Herring | 524/411 |
| 4,504,532 | 3/1985 | Herring | 428/36 |
| 4,523,524 | 6/1985 | Cobb | 102/374 |
| 4,602,480 | 7/1986 | Hill et al. | 220/414 |

FOREIGN PATENT DOCUMENTS 622217 4/1949 United Kingdom ............... 60/253

Primary Examiner—Donald E. Stout
Attorney, Agent, or Firm—William G. Auton; Donald J. Singer

[57] ABSTRACT

Composite polar bosses applied in rocket motor cases have very desirable characteristics. The lead time for a boss can be reduced from 6-12 months to 4-6 months. Weight savings for the boss/nozzle assembly are about 20-40 percent. A composite polar boss which attaches nozzle assemblies to solid fueled rocket motor cases is disclosed. This polar boss is a carbonized fabrication which sits within a circumferential indentation within the motor case, and has a threaded inner circumference which permits the nozzle assembly to be attached thereto. The materials of the boss are selected to permit a service temperature of up to 3,200 degrees F.

1 Claim, 4 Drawing Sheets

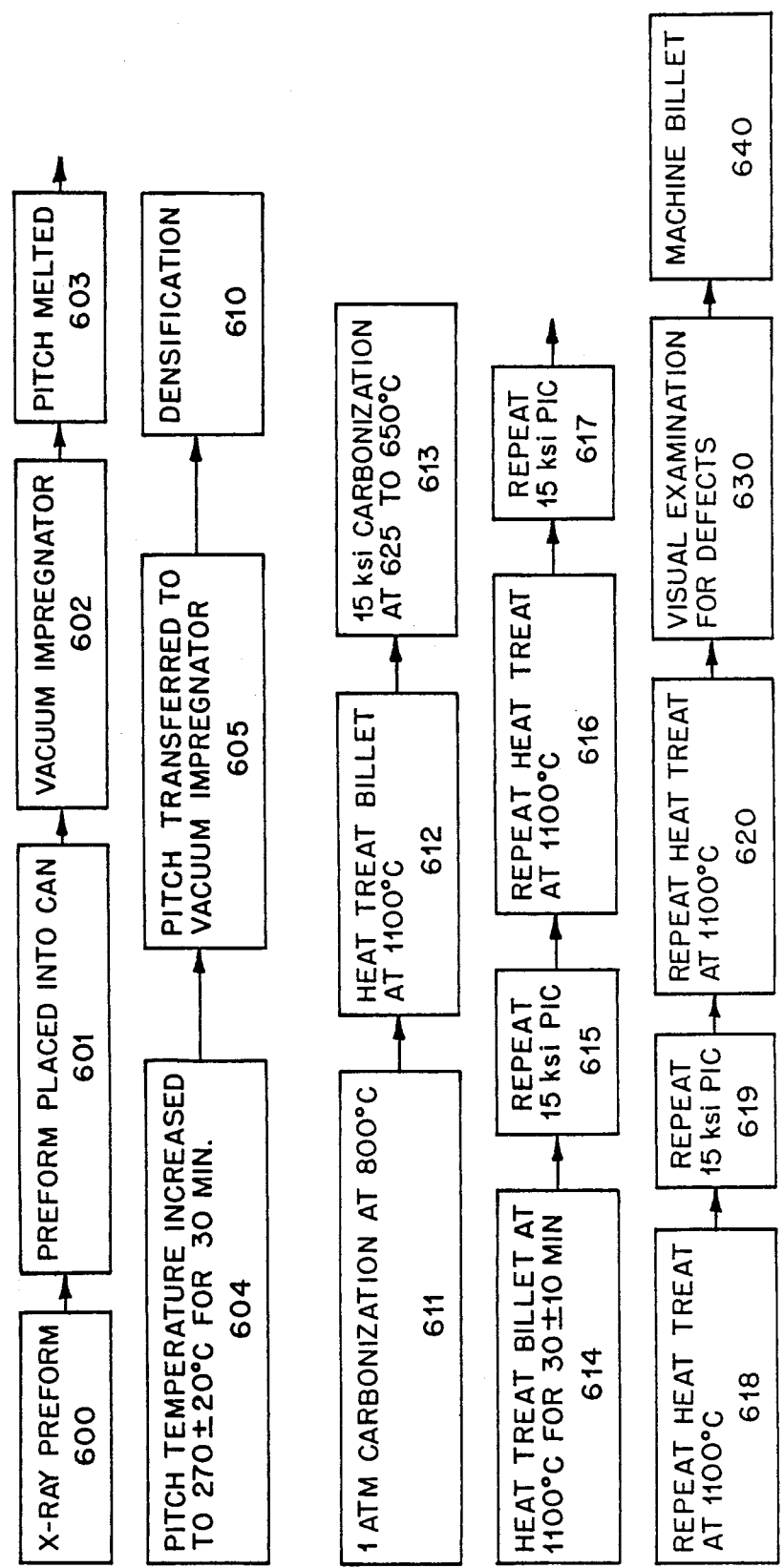

ADVANCED COMPOSITE POLAR BOSS

STATEMENT OF GOVERNMENT INTEREST

The invention described herein may be manufactured and used by or for the Government for governmental purposes without the payment of any royalty thereon.

CROSS REFERENCE TO RELATED APPLICATION

The subject matter of this application is related to the subject matter contained in the following U.S. patent application: application Ser. No. 109,557, filed herewith, entitled "Contemporary Composite Polar Boss" by Mr. Hugh Reynolds et al; now U.S. Pat. No. 4,807,531, the disclosure of which is specifically incorporated by reference.

BACKGROUND OF THE INVENTION

The present invention relates generally to rocket propulsion systems, and more specifically to a high temperature composite polar boss for use in place of metal for rocket motor polar bosses.

Development and production for solid rocket motors can be seriously affected by the long acquisition lead times for the conventional forged metal polar bosses used in composite motor cases. In addition, the long lead times for forged tooling severely restrict needed development program flexibility in making design changes. As an example, the development program for the inertial upper stage (IUS) solid rocket motors, had lead times of over a year for the closed-die forgings.

The task of finding an alternative to metal for rocket motor polar bosses, particularly for rockets with high operating temperatures is alleviated, to some extent, by the systems disclosed in the following U.S. patents, the disclosures of which are incorporated by reference:
U.S. Pat. No. 4,745,008 issued to Plotzker et al;
U.S. Pat. No. 3,465,965 issued to Schrewelius;
U.S. Pat. No. 4,359,190 issued to Pagano;
U.S. Pat. No. 4,369,894 issued to Grover et al;
U.S. Pat. No. 4,501,841 issued to Herring;
U.S. Pat. No. 4,504,532 issued to Herring, and
U.S. Pat. No. 4,523,524 issued to Cobb.

Cobb shows a solid propellant rocket motor tube or casing made of composite material such as graphite or glass fibers bonded together. A nozzle is attached to the aft end of the tube by bolt and nut.

Grover et al are concerned with a filament would pressure vessel having a polar opening with a fitting disposed in the opening and protruding therefrom. A plurality of layers of filaments are wound about the polar fitting.

Pagano discusses a rocket nozzle formed by laminating identical fabric-reinforced composite plies of uniform thickness in such a way that each ply extends to the extremities of the body in both the radial and axial directions. Claim 7 of this patent mentions a matrix of graphite cloth reinforced with phenolic, and in which the matrix is impregnated with a pitch-furfural blend, carbonized, and graphitized.

Schrewelius is directed to a tail-pipe nozzle for rocket motors having at least on the inside a fine-mesh, and a three-dimensional skeleton of recrystallozed silicon carbide. The two Herring patents both disclose temperature resistant heat insulator materials for rocket motors. Carbon fibers are mentioned as one of the materials in Herring Patent No. 4,504,532.

Since the introduction of carbon-carbon materials into solid rocket motor nozzles, the number of parts making up the nozzle has decreased dramatically, resulting in a much simpler structure. The above-cited Plotzker et al reference discloses a process for fabricating carbon-carbon articles. However, while the above-cited references are instructive, the need remains to provide an alternative to metal for the polar bosses of rocket motors with high operating temperature. The present invention is intended to satisfy that need.

SUMMARY OF THE INVENTION

The present invention is a composite boss capable of operating at high temperature, which forms part of a rocket motor case and is used for securing the rocket nozzle or hot gas valve to the rocket case. The polar boss is machined from a billet made of either CompGlas (silicon carbide fibers in a glass matrix) or ceramic fibers in a carbon pitch matrix. The fibers can be woven two-dimensional (2D) or three-dimensional (3D), oriented either in an approximate 50:50 combination of circumferential and radials, or an approximate 40:40:20 combination of circumferential, radial and axials respectively. The billet is processed the required number of times under the temperatures and pressures needed to reach the desired densification of the part. A composite boss has the advantages over commonly used aluminum forged bosses of reduced part lead time, and boss/nozzle component weight savings since intermediate nozzle components are eliminated.

The advanced composite polar boss of the present invention is intended for use in place of metal for rocket motor polar bosses in high temperature ($\geq 1,200$ degrees F.) applications. A principal purpose of the use of the invention is to reduce the required lead times in the manufacture of polar bosses. The lead time for a boss can be reduced from 6–12 months to 4–6 months. Weight savings for the boss/nozzle components are about 20–40 percent.

One embodiment of the present invention is an annular ring that is machined from a billet of the heat-resistant ceramic materials mentioned above. The annular ring is machined to provide a means of interfacing with a nozzle assembly to connect it at the aft end of the rocket motor case. This machining includes shaping the perimeter of the annular ring so that it fits into a complementary annular indentation in the rocket motor case, and threading the inner circumference of the annular ring to enable it to be physically attached to similar threads in the rocket nozzle mechanism.

It is an object of the present invention to provide an alternative to metal bosses for high temperature applications, in rocket motor cases.

It is another object of the present invention to provide an alternative to metal rocket polar boss/nozzle components which have reduced weight.

These objects together with other objects features and advantages of the invention will become more readily apparent from the following detailed description when taken in conjucntion with the accompanying drawing wherein like elements are given like reference numerals throughout.

DESCRIPTION OF THE DRAWINGS

FIG. 6 is an illustation of a process which can be used to make the polar boss of FIGS. 4 and 5.

DETAILED DESCRIPTION OF THE PREFERRED EMBODIMENT

The present invention is an advanced composite polar boss for use in high temperature applications with rocket motor cases.

Figure 1:
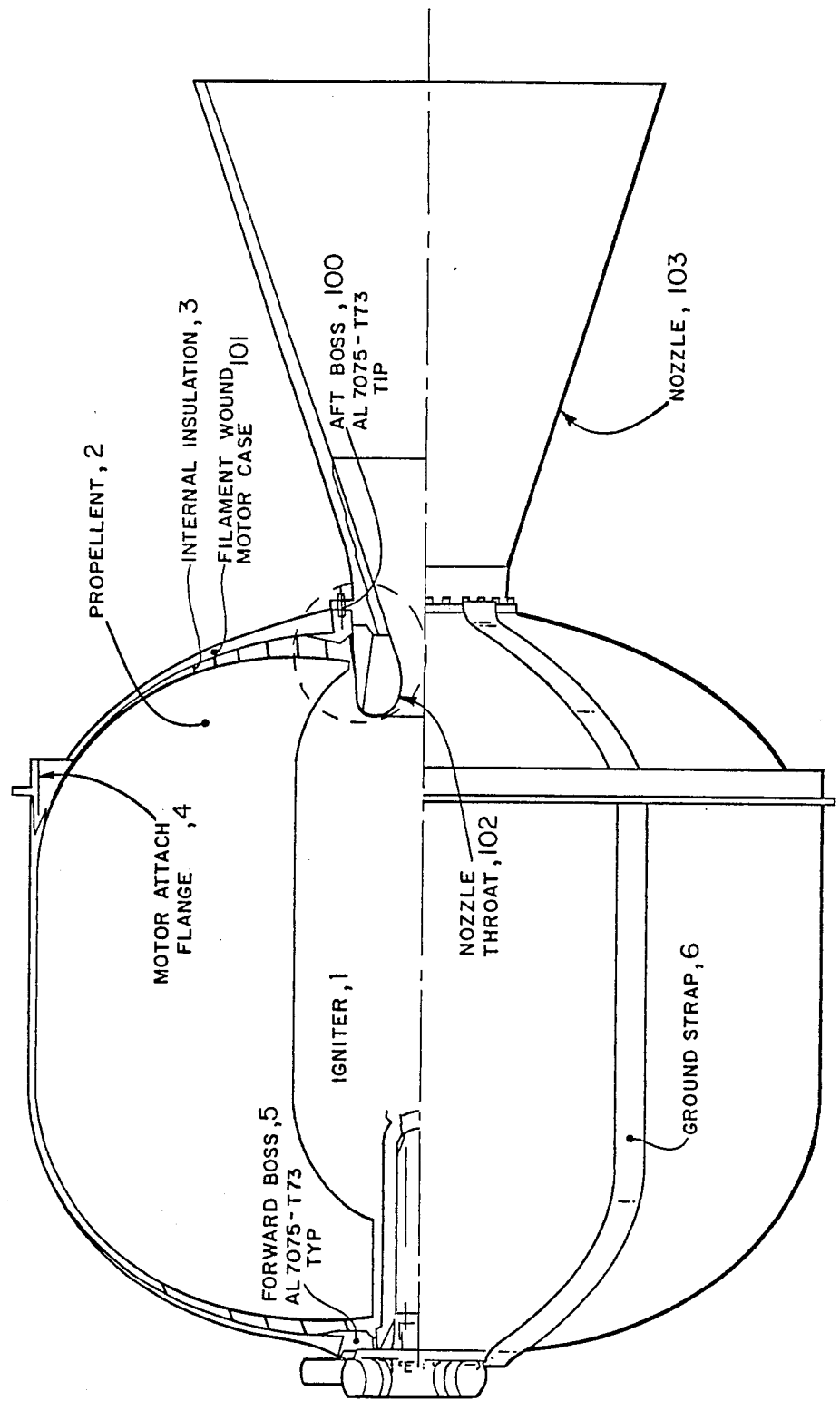
FIG. 1 is a sectional view of a prior art solid rocket motor.

The reader's attention is now directed towards FIG. 1, which is a sectional view of the 27.0 inch diameter FW-5 solid rocket motor produced by the Chemical Systems Division (CSD) of United Technologies. This particular rocket motor has a burst pressure range of 1,675 to 2,050 psi, and uses an annular aluminum polar boss 100 to attach the nozzle 103 to the motor case 101.

The rocket motor in FIG. 1 contains: an igniter 1, propellent 2, with internal insulation 3, which are housed in a motor case 101. The polar boss 100 is used to attach the nozzle 103 to the motor case 101 at the nozzle throat location 102, as the motor attachment 4 is used to attach this rocket motor to the rocket.

The aft polar boss 100 is an annular ring with a 5.2 inch inner diameter compatible with existing carbon-carbon fixed or movable hot ball and socket nozzles. The purpose of the aft polar boss is to provide a means of attaching the rocket nozzle to the motor case. This is better illustrated in the sectional views of FIGS. 2 and 3 as discussed below.

Figure 2:
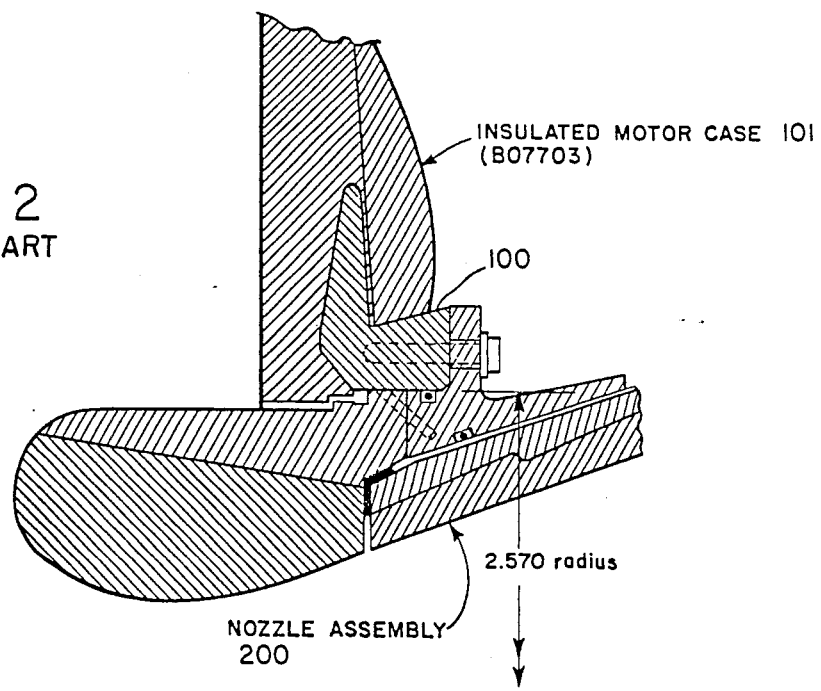
FIGS. 2 and 3 respectively depict detailed sectional views of the nozzle assemblies attached to rocket motor cases by polar bosses.
Figure 3:
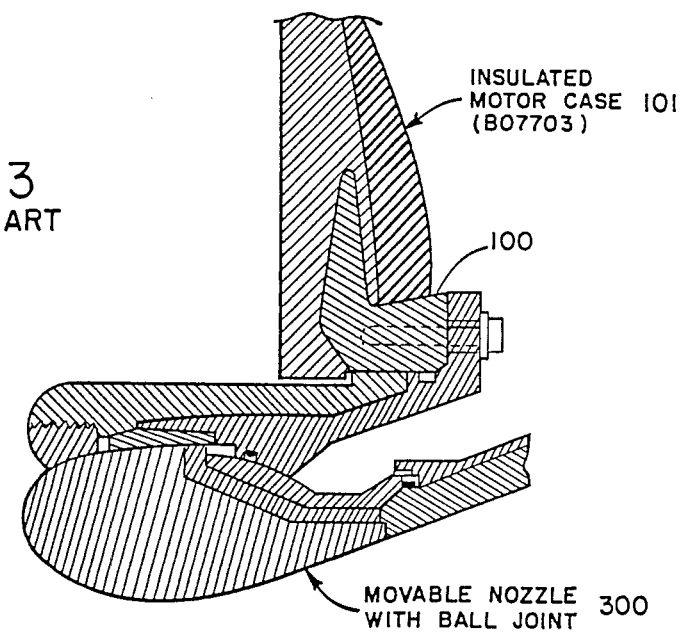

FIGS. 2 and 3 respectively depict detailed sectional views of a typical fixed nozzle 200 (in FIG. 2) and a moveable nozzle 300 (in FIG. 3) which are each attached to the motor case 101 of a FW-5 rocket motor by a polar boss 100. In production the lead time for conventional metal polar bosses ranges from six to twelve months, and for the FW-5 rocket motor, has a weight of 1.26 lb.

Figure 4:
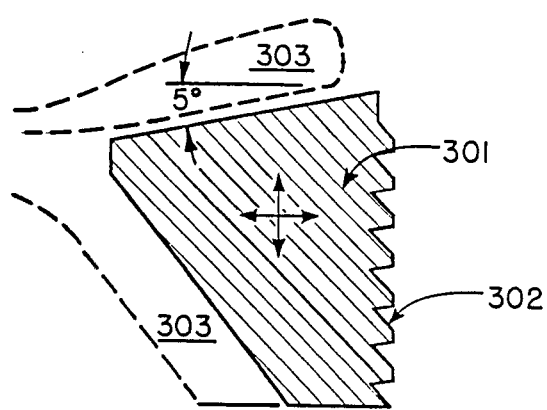
FIG. 4 is a sectional view of the polar boss of the present invention

The reader's attention is now directed towards FIG. 4 which is a sectional view 301 of the polar boss of the present invention. The system of FIG. 4 is a composite boss that will interface directly with fixed or moveable hot-running carbon-carbon nozzles (for example, the carbon-carbon hot ball and socket nozzle). Like the polar boss of the above-cited Reynolds et al reference, this boss is machined from a cylindrical-shaped billet. Its outer perimeter is shaped to fit into a contour of the rocket motor case 303. Its inner circumference is machined with threads which have a pitch of 6, and which may be fixed to a complementary set of buttress threads on the nozzle assembly 302.

The system of FIG. 4 differs from the above-cited Reynolds et al reference in that the polar boss of the present invention is designed with composite reinforcements and matrix materials and processing techniques which have a high temperature ($\geq 1200°$ F.) capability. Candidate materials include both CompGlas (silicon carbide fibers in a glass matrix) and ceramic fibers in a carbon pitch matrix. The fibers can be oriented either in an approximate (2D) 50:50 combination of circumferential and radial orientating, or an approximate (3D) 40:40:20 orientation circumferential and radial and axial orientations respectively.

The polar boss of FIG. 4 is formed from a billet material that is cylindrically wound or woven so that 40 percent of the reinforcement will be in both the circumferential and radial directions and 20 percent will be in the axial direction. When the material is a ceramic/carbon fabrication (such as the AB 312 carbon composite discussed below) the preform is impregnated with a furfurylic resin or equivalent and carbonized and densified at 1000° F. to 2000° F. for a total of two to five cycles in order to obtain the required density. Fiber volume will be approximately 50 percent. Sources for this material include FMI, Avco, and General Electric (GE) based on their demonstrated capabilities in carbon-carbon 3D billets and prior use of the selected fibers and matrix. The composite material procured is in the form of a billet that has an OD of 9.0-inches, and ID of 5.0-inches, and a thickness of 2.3 inches.

The choice of candidate materials is discussed further below. Another choice candidate is a 2D flat laminate of SiC/LAS COMPGLAS ceramic composite. The LAS glass is similar to Corning 9608 Pyroceram. The material was developed by United Technologies Research Center (UTRC) for use in jet engine turbine blades, tip seals, radial turbine rotor divergent seals, composite cylinders for gun-based liners, ramjet combustors, space structures, and laser mirrors because of its good mechanical properties and low thermal expansion. Fracture toughness of the COMPGLAS is an order of magnitude greater than that of conventional ceramic materials, approaching the toughness of graphite/epoxy and aluminum alloys. The mechanical properties of SiC/LAS COMPGLAS are maintained with temperatures up to 1800° F.

The advanced composite boss billets can be fabricated from silicone carbide fiber that is spirally woven into an eight-harness stain cloth with 20 to 24 ends/inches in both the warp and fill directions (circumferential and radial). The cloth would be impregnated with LAS powder in a slurry, dried, and press-molded at the melting temperature of the LAS glass while under vacuum or inert gas. The complete process takes approximately 3 hours. Billets 9.0 inches OD$\times$5.0 inches ID$\times$2.3 in. thick would be produced with a fiber volume of approximately 50–60 percent. At present the processes used are considered state-of-the-art.

The full listing of advanced composite polar boss design requirements is shown in Table 1. Adequate stiffness, both torsional and radial, is required to resist boss rollout, provide uniform bearing on the motor case overwind, and ensure deformation compatibility with the nozzle closure, so as to provide a reliable chamber gas seal. Adequate strength is also required to withstand the resultant deformations. These requirements notwithstanding, the nozzle attachment for the advanced polar boss is the area of prime consideration relative to supplemental requirements. Because of the high temperature and relatively low strength of nozzle carbon-carbon materials, studs and shear key nozzle attachment features are not considered appropriate. However, threads, both Acme and buttress, have been used successfully for carbon-carbon structural joints (such as IUS and Improved Tomahawk nozzles) and provide good load distribution (minimum peak or local loading) and good strength.

TABLE 1

Hoop modulus $\geq 2\times 10^6$ psi
Hoop strength $\geq 8000$ psi

Shear strength ≧2500 psi (at least equivalent to the nozzle carbon-carbon)
Axial compressive strength ≧5000 psi
Thermal degradation ≦20 percent at 1200° F.
Thermal diffusivity of <0.20 ft²/hr.

The design requirements listed in Table 1 is a list of desirable properties used to identify promising material candidates. These candidates are: (1) strengthened ceramic matrix, (2) ceramic fiber-reinforced ceramic matrix, (3) carbon fiber-reinforced ceramic matrix, (4) ceramic fiber-reinforced metal matrix (5) ceramic fiber reinforced carbon matrix, and (6) carbon fiber reinforced carbon matrix. The available candidate materials with properties meeting those defined by the design requirements are discussed below, categorized by primary matrix material.

Unreinforced ceramics have been found suitable in the past for rocket nozzle and closure components up to 9 inches in diameter, but presented severe difficulties when cylindrical sections upwards of 18 inches in diameter were made. These ceramics were produced in powder form and normally shaped by powder metallurgy techniques involving hot pressing or sintering. Metallic diborides and nitrides of silicon and boron were investigated. Corning's MACOR, consisting mostly of Si, Alumina, and $M_3O_3$, has physical properties approaching those required, but may be marginal in terms of thermal performance requirements and shock/fracture resistance due to its brittleness.

A suitable ceramic which is not as susceptible to fracture during impact or in the presence of a notch under stress, is produced by UTRC. This tough ceramic, developed for applications in gas turbine engines, space satellites, and bearings, is a fiber-strengthened glass-ceramic, known under the trade name of COMPGLAS. Throughout UTRC's COMPGLAS development effort, a wide range of fiber reinforcements has been explored. Fibers were chosen on the basis of their high strength, high stiffness, and low density. The fibers used included large-diameter (150 mm) filaments of boron and silicon carbide and smaller diameter filamentary yarns (individual fiber diameters of 7 to 30 mm) of graphite, alumina, aluminasilicate glass, boron nitride, and silicon carbide. The composite systems that were found to combine strength, toughness, and high temperature resistance were SiC and graphite fiber-reinforced glass/ceramic. These materials satisfy all design requirements of the advanced composite polar boss listed above in Table 1. Carbon-carbon materials are able to withstand temperatures of up to 3,200 degrees F.

Several carbon-and ceramic-reinforced carbon matrices (both carbonized or graphitized) have suitable structural and thermal capabilities. The ceramic/carbon composite material is notable for its good temperature capability, and low thermal diffusivity. Specialty composite fabricators in the United States (e.g., Fiber Materials, Incorporated (FMI)) have indicated that a number of ceramic fibers (SIC, AB-312, and alumina) can be interwoven with graphite fiber in 3D configurations and carbonized to produce parts with the required strength properties and a thermal conductivity value low enough to satisfy the requirements for an advanced composite polar boss. Hence, the carbon matrix materials are acceptable candidates for advanced bosses.

The manufacturing process of carbon-carbon fabrication is described in the above-cited Plotzker et al reference. Graphitization of a matrix lends the composite to a higher thermal diffusivity and reduced structural properties. CSD, therefore, is considering only a "carbonized" matrix. A graphitized matrix is obtained by cycles of high pressure impregnation at temperatures of 4500° to 5000° F. where a carbonized matrix is obtained by cycles of high pressure impregnation at temperatures of approximately 2000° to 3000° F.

Carbon matrix composites are often classified as 2D, 3D, etc., depending upon the number of directions for reinforcement.

The candidate 2D carbon matrix material is made from reinforcing fibers woven into broadgoods. The multidirectional reinforced composite materials would be achieved by two dimensional winding, weaving, knitting or braiding of the graphite or ceramic fibers.

The 3D carbon matrix materials are the more tailorable of the two types. By controlling the amount and type of fibers in each axis, the properties may be balanced (equal) or increased in any of the axes to obtain increased strength, shear capability, thermal diffusivity, or differential expansion characteristics. The advantages offered by the multidirectionally reinforced materials are (1) higher strength in the third direction perpendicular to the plies of a 2D materials, which also results in significantly greater shear strength as compared to interlaminar shear in a 2D material, and (2) generally improved mechanical properties due to a higher reinforcement content.

The most suitable candidate materials for fabricating the billet of FIG. 4 include the ceramic/carbon and the ceramic/ceramic materials. More specifically, the above-identified AB-312 (alumina-boria silica)/carbon material has the properties identified below in Table 2.

TABLE 2

| Thermal/structural properties | AB-312(Alumina boria silica)/carbon 3-D |
| --- | --- |
| Density, lb/inches³ | 0.080 |
| Moduilus, psi × 10⁶ | 5.3 |
| Tensile strength, psi × 10³ | 8.1 |
| Thermal diffusivity, ft²/hr (at 1200° F.) | 0.051 |
| Strength retention at 1200° F. | 90 |
| Upper limit use temperature, °F. | 3200 |
| Shock and fracture sensitivity | Good |

AB-312 fiber is the preferred fiber (first choice) in the ceramic reinforced carbon matrix. A billet of this material is carbonized and densified at temperatures between 1000 to 2000 degrees F., then machined into an annular ring with a cross section as depicted in FIG. 4. The availability or lead time, on such a machined boss has been found to be six months, which represents up to a 50 percent reduction in time for a comparable metal boss.

The silicon carbide reinforced glass was ranked second along side the alumina reinforced carbon matrix. The silicon carbide reinforced glass matrix was selected for its high stiffness, 100 percent strength retention at 1200° F. and low thermal diffusivity which allows interfacing with a hot carbon nozzle without the need for any insulation between the polar boss and motor case. The material has had extensive development for high temperature use and an excellent materials property data base. The silicon carbide reinforced glass has the properties identified below in Table 3.

TABLE 3

| Thermal/structural properties | UTRC COMPGLAS - silicon carbide/glass ceramic |
| --- | --- |
| Density | 0.090 |
| Moduilus, psi × 10$^6$ | 17 |
| Tensile strength, psi × 10$^3$ | 24 |
| Thermal diffusivity, ft$^2$/hr | 0.026 |
| Strength retention at 1200° F., percent | 100 |
| Upper limit use temperature, °F. | 2000 |
| Shock and fracture sensitivity | Good |

The silicon carbide billet is machined into an annular ring which has a cross section as depicted in FIG. 4. The resultant composite polar boss is available with a lead time of eight months. This lead time represents a savings over the time required for a comparable metal boss.

The graphite-reinforced glass (carbon/ceramic) ranked third because of its marginal upper limit use temperature (long-term soak data) and higher thermal diffusivity. This material has an upper limit use temperature above 1200° F. for short term use at temperatures typical of motor firings. The properties of this material are as depicted below in Table 4

TABLE 4

| Thermal/structural properties | UTRC COMPGLAS PAN graphite/glass ceramic |
| --- | --- |
| Density, lb/inches$^3$ | 0.072 |
| Modulus, psi × 10$^6$ | 17 |
| Tensile strength, psi × 10$^3$ | 24 |
| Thermal diffusivity, ft$^2$/hr | 0.11 |
| Strength retension at 1200° F., percent | 80 |
| Upper limit use temperature, °F. | 1110 long term |
|  | 1200 short term |
| Shock and fracture sensitivity | Good |

Graphite-reinforced glass billets are machined into an annular ring with a cross section as depicted in FIG. 3. The result is a polar boss with a lead time of 8 months.

Figure 5:
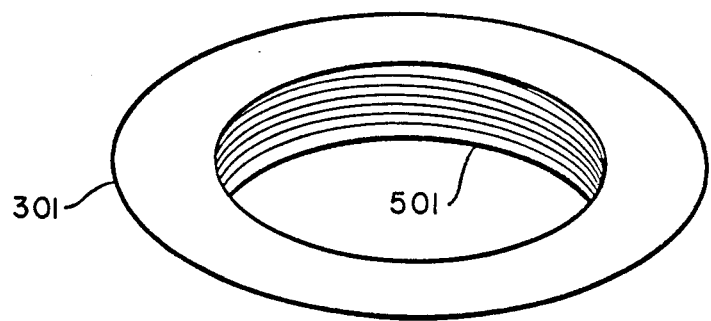
FIG. 5 is another view of the polar boss of FIG. 4.

FIG. 5 is a view of the billet of FIG. 4 which shows its donut shape. The outer diameter of the billet 301 is shaped to fit withing a complimentary indentation in the rocket motor case. The inner diameter 501 of the billet has the threads machined into it to enable the nozzle assembly to be attached to it as described above.

The reader's attention is now directed towards FIG. 6, which is an illustration of a process which can be used to fabricate a polar boss billet of the present invention. The process consists of weaving a 3D preform, impregnating the preform with a carbon pitch matrix, carbonizing the billet, and densifing the billet. The billet is then machined into a polar boss with a cross section as depicted in FIG. 4.

As explained in the above-cited Plotzker et al reference, carbonizing is a form of pyrolysis in which a fabric undergoes chemical decomposition into carbon after being saturated with resin or pitch, and treated with heat. An example of billet fabrication can begin with impregnating a preform with V15 carbon pitch. Billets can be fabricated at thickness of 2.0 inches to 9.0 inches with an ID at 5 inches and an OD of 9.0 inches. The carbonizing process results in the donut shaped billet that is machined to give it a cross section as depicted in FIG. 4. This includes the machining of the inner circumference of the billet, to provide it with threads that attach with the rocket nozzle assembly. Thread form tests were performed to investigate the relative shear strength of 6 versus 8 threads/inches. For the AB-312/carbon material it was found that 6 threads/inches had 15 percent higher thread shear strength the 8 thread/inches. Therefore for optimum shear strength, it is recommended that the thread pattern of the inner circumference be 6 threads/inch, for the type of material selected for use.

In the process of FIG. 6, the preform is composed of stiffened radial pultruded AB-312 fibers. The resin used is 15 V pitch, which is carbonized by heat treatment. Impregnation of the preform begins with X-ray treatment of the preform 600.

Next, the preform is placed into a container for impregnation. This container is instrumented with thermocouples and is, in turn, placed in a vacuum impregnation 601.

Vacuum impregnation 602 is conducted at 300°±50° C. at 28 in. Hg for a minimum of 90 minutes. This step 602 is conducted about 24 hours prior to the addition of pitch to the preform.

To prepare for the addition of pitch to the preform, pitch is melted in a separate vacuum vessel 603. The pitch is melted at a temperature of 150°±50° C. and a pressure of 28 in. Hg. Next, the pitch temperature is increased 604 to a temperature of 270°±20° C. for 30 minutes (as a minimum). This increase of temperature step 604 is conducted no more than 24 hours before the addition of the pitch to the preform 605.

Pitch is transferred to the vacuum impregnator by gravity feed 605, with the impregnator bit 28 in. Hg, and by pressurizing the pitch between 0 and 5 psig. The liquid pitch should should be added to the can which contains the preform so that it cover the preform by a minimum of two inches. With the addition of pitch 605 complete, the densification process 611 begins.

The densification process 610 is composed of ten steps 611–620, and followed by a visual examination of the carbonized preform for defects 630, and the machining of the carbonized preform into the billet 640. The ten steps include a repetition of the heat treatment and carbonized cycles, and begins with the first carbonization step 611 in which the preform is carbonized at 800° C. at one atmosphere of pressure while immersed in the pitch. The first step is maintained between one and four hours, after which the preform is cooled to 150° C. in a nitrogen atmosphere.

In the next step 612 of the densification process, the billet is heated to 1,100° C. for about 30 minutes. This is followed by a carbonization step 613, in which the preform is carbonized at 15 Ksi at 625°–650° C. for 90 minutes, and cooled to 200° C. The cycles of heat treatment and carbonization are repeated 614–620 until the preform is carbonized, and ready to be machined 640 to add the threads and form the polar boss of the present invention.

Note that the process described above is intended to serve as just an example of a method of fabricating the present invention. Numerous alternatives and variations exist, including fiber or matrix systems which may substituted.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A composite polar boss for attaching a nozzle assembly to a solid fueled rocket motor case, said solid fueled rocket motor case having an exhaust opening which has an indentation which circumscribes its inner circumference, said composite polar boss comprising:
an annular billet which forms a ring with an outer circumference which is shaped to fit within the indentation of the solid fueled rocket motor case, said annular billet thereby being fixed to said solid fueled rocket motor case, said annular billet having a threaded inner circumference which screws onto a complementary set of threads on said nozzle assembly to attach it to said fueled rocket motor case, said annular billet being constructed of materials which enable it to withstand service temperatures of up to about 1,200 degrees F., wherein said annular billet is composed of carbon-carbon fabricated material which is machined into said ring with said set of threads machined onto its inner circumference, and wherein said carbon-carbon fabricated material includes 2D and 3D fabrics which have been impregnated with a resin and carbonized into said annular billet.

* * * * *